(12) United States Patent
Tao et al.

(10) Patent No.: US 6,243,621 B1
(45) Date of Patent: *Jun. 5, 2001

(54) METHOD OF DETERMINING WORKPIECE POSITIONS INCLUDING COORDINATED MOTION

(75) Inventors: Jianming Tao, Rochester Hills; Jason Tsai, Bloomfield Hills; Robert A. Bolhouse, Northville, all of MI (US)

(73) Assignee: FANUC Robotics North America, Inc., Rochester HIlls, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/039,114

(22) Filed: Mar. 13, 1998

(51) Int. Cl.$^7$ .................................................. G06F 19/00
(52) U.S. Cl. .......................... 700/245; 700/64; 700/86; 700/166; 700/186; 700/253; 700/255; 700/259; 700/262; 318/568.11; 356/375; 356/376; 219/124.34
(58) Field of Search ..................................... 700/245, 250, 700/253, 262, 186, 166, 259, 255, 64, 86; 318/568.11, 574; 219/124.34; 901/5, 10; 356/376, 375

(56) References Cited

U.S. PATENT DOCUMENTS

| | | | |
|---|---|---|---|
| 4,429,266 | * 1/1984 | Tradt ...................... | 318/568 |
| 4,590,578 | 5/1986 | Barto, Jr. et al. ................ | 700/254 |
| 4,595,989 | 6/1986 | Yasukawa et al. ............... | 700/254 |
| 4,661,032 | 4/1987 | Aria .................................. | 700/260 |
| 4,763,276 | 8/1988 | Perreirra et al. ................... | 700/262 |
| 4,815,006 | 3/1989 | Andersson et al. .............. | 700/254 |
| 4,831,232 | * 5/1989 | Andersson et al. ............ | 219/124.34 |
| 4,853,874 | 8/1989 | Iwamoto et al. ................ | 700/249 |
| 5,014,183 | 5/1991 | Carpenter et al. ............... | 700/64 |
| 5,053,975 | 10/1991 | Tsuchihashi et al. ............ | 700/264 |
| 5,219,264 | * 6/1993 | McClure et al. ................ | 414/730 |
| 5,297,238 | 3/1994 | Wang et al. ..................... | 700/259 |
| 5,333,242 | 7/1994 | Watanabe et al. .............. | 700/254 |
| 5,345,540 | 9/1994 | Schleifer et al. ............... | 700/251 |
| 5,392,384 | 2/1995 | Tounai et al. ................... | 700/254 |
| 5,465,037 | * 11/1995 | Huissoon et al. .............. | 318/568.11 |
| 5,495,090 | * 2/1996 | Mukai et al. ................... | 219/124.34 |
| 5,495,410 | * 2/1996 | Graf ................................ | 700/86 |
| 6,044,308 | * 3/2000 | Huissoon ......................... | 700/166 |

OTHER PUBLICATIONS

Rijanto et al., Experimental Positioning Control of Flexible Arm Using Two–Degrees–Of–Freedom Controller, IEEE., p. 127, 1997.*

F. Dai, Collision–Free Motion of an Artivulated Kinematic Chain in a Dynamic Environment, IEEE., pp. 70–74, 1988.*

\* cited by examiner

*Primary Examiner*—William A Cuchlinski, Jr.
*Assistant Examiner*—McDieunel Marc
(74) *Attorney, Agent, or Firm*—Howard & Howard

(57) ABSTRACT

A method of determining position information of a workpiece relative to a robot includes the ability to move the workpiece into a variety of orientations relative to the robot during the touch sensing location procedure. The position information is then used for performing a robot operation including coordinated motion. A coordinated reference frame is defined with respect to a moveable positioner that supports the workpiece. Known kinematic relationships between the positioner and the robot are used to control operation of the robot within the coordinated reference frame throughout the touch sensing location procedure. By moving the workpiece relative to the robot during the touch sensing location procedure, a greater variety of workpieces can be processed and relatively complicated workpiece configurations can be accurately determined. The robot operating parameters are modified according to the determined position information.

28 Claims, 3 Drawing Sheets

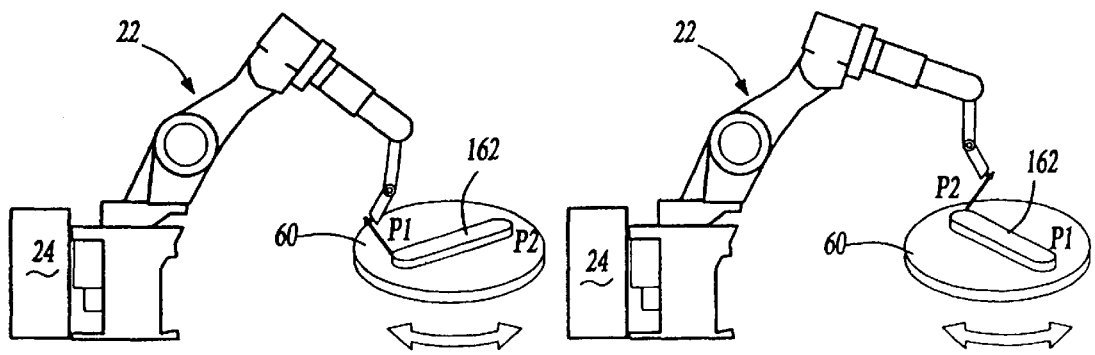
*Fig-4a*  *Fig-4b*
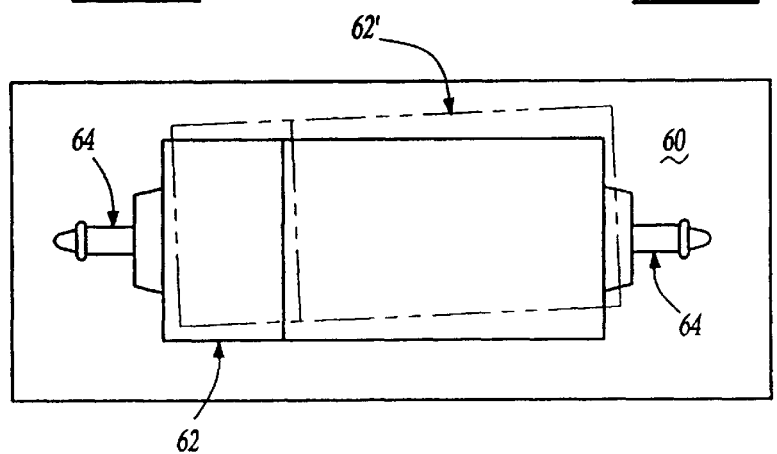
*Fig-5*
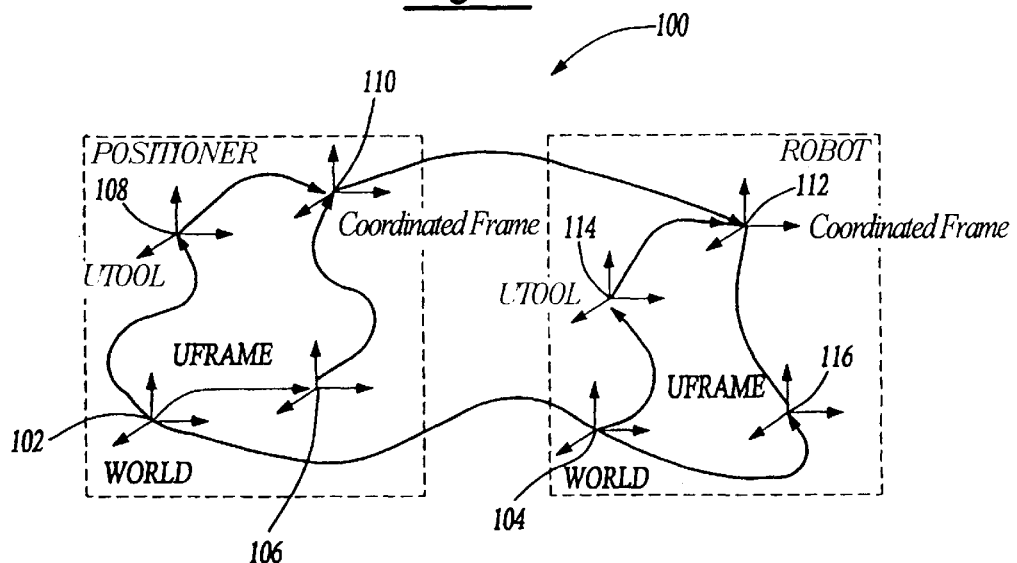
*Fig-6*

METHOD OF DETERMINING WORKPIECE POSITIONS INCLUDING COORDINATED MOTION

BACKGROUND OF THE INVENTION

This invention generally relates to a system for determining the position of an object relative to a robot. More particularly, this invention relates to a device and method for determining the location, orientation and configuration of an object relative to a robot.

Robots have many industrial uses. One challenge associated with all robot operations is ensuring that the robot performs the desired operation accurately. A typical operation requires accurately locating a workpiece relative to the robot so that the robot moves into appropriate positions to perform the desired operations. A variety of methods have been suggested for locating a workpiece relative to a robot.

One method of locating a work piece relative to a robot includes "touching off" on various selected points of the workpiece. Typically, a touch-sensitive device is supported on the robot arm and robot position information is recorded when the sensing device contacts the workpiece. The robot information is then used to determine the location of the workpiece relative to the robot. An example of this method is disclosed in U.S. Pat. No. 4,590,578.

While the conventional touch sensing operation is useful, it is not without drawbacks and is not adequate for all situations. Typical touch sensing operations require that the workpiece be placed in a fixed position relative to the robot throughout the locating procedure. This is required because the reference frame of the robot relative to the workpiece becomes meaningless if the workpiece moves relative to the robot between touches during the location procedure. In many instances, the size of the workpiece or the workpiece configuration does not permit the robot to accurately determine all of the needed position or configuration information while using the conventional technique. It often is necessary or desirable to move the workpiece into various positions and/or orientations relative to the robot during the location procedure. With conventional techniques, this cannot be accomplished.

This invention addresses the need for determining the position, orientation and/or configuration of a workpiece while allowing the workpiece to be reoriented relative to a robot during a touch sensing procedure. With this invention it becomes possible to move a workpiece relative to the robot throughout the locating procedure, which represents a substantial advantage compared to the conventional technique.

SUMMARY OF THE INVENTION

In general terms, this invention is a method of determining a position of a workpiece relative to a robot that has a robot arm supported by a base and a sensor supported on the robot arm. The workpiece is supported on a positioner that is moveable relative to the robot. The method includes several basic steps. The positioner is oriented in a known orientation relative to the robot. The workpiece is then supported on the positioner such that the workpiece remains fixed relative to the positioner. The robot arm is then moved until the sensor contacts a first target point on the workpiece to locate the first target point relative to the robot. Then the positioner is moved into a second orientation to reorient the workpiece relative to the robot. Then the robot arm moves until the sensor contacts a second target point on the workpiece to locate the second target point relative to the robot. Depending on the requirements of a particular situation, the number of target points and workpiece orientations is varied. Finally, the position of the workpiece relative to the robot is determined using the locations of the first and second points that have been previously determined.

In the preferred implementation of this invention, the method includes defining a coordinated reference frame relative to the positioner. Each target point that is located relative to the robot is converted to be defined relative to the coordinated reference frame during the workpiece location procedure. This enables the workpiece to be moved into various orientations relative to the robot without negating the target point locations obtained prior to moving the workpiece.

The various features and advantages of this invention will become apparent to those skilled in the art from the following detailed description of the currently preferred embodiment. The drawings that accompany the detailed description can be briefly described as followed.

BRIEF DESCRIPTION OF THE DRAWINGS

FIG. 4a schematically illustrates one problem addressed by this invention.

FIG. 4b illustrates the embodiment of FIG. 4a in a second position.

FIG. 5 schematically illustrates another potential problem that is solved by this invention.

FIG. 6 schematically illustrates reference frame relationships used in performing the method of this invention.

DETAILED DESCRIPTION OF THE PREFERRED EMBODIMENT

Figure 1:
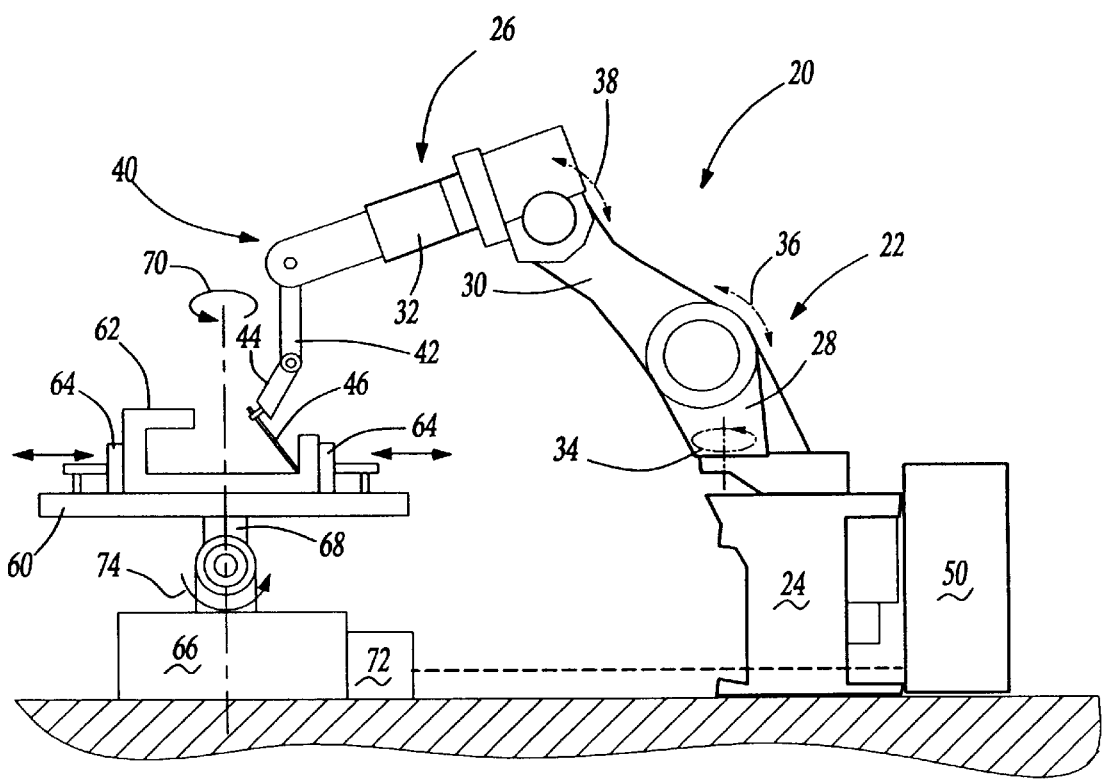
FIG. 1 diagrammatically illustrates a system designed according to this invention.

FIG. 1 diagrammatically illustrates a robot system 20. An industrial robot 22 includes a base 24 and a robot arm 26 supported on the base 24. The robot arm 26 includes a plurality of arm portions 28, 30 and 32. The robot arm 26 is moveable into a plurality of orientations by moving the arm portions about a plurality of arm axes. In the illustrated example, the arm portion 28 is moveable relative to the base 24 as indicated by the arrow 34. The arm portions 28 and 30 can be pivoted or moved relative to each other as indicated by the arrow 36. Similarly, the arm portions 30 and 32 can be pivoted or flexed relative to each other as indicated by the arrow 38. The arrows 34, 36 and 38 are representative of three arm axes about which the robot arm is moveable. The specific configuration of the robot arm 26 is only shown as an example for purposes of describing this invention. A variety of robot configurations can be used to implement this invention.

At one end of the robot arm 26, a robot wrist 40 includes moveable wrist components 42 and 44. A tool 46 is supported by the robot wrist 40. For purposes of illustration, the tool 46 will be considered to be a welding torch, however, a variety of tools can be used within the scope of this invention.

In the most preferred embodiment, a sensor 48 is supported at one end of the tool 46. The sensor 48 preferably is a touch-sensitive sensor that is useful for generating a signal indicating when the sensor 48 has come into contact with an object or surface. Such sensors are commercially available. The sensor 48 communicates with an electronic controller 50 for the robot 22, which is schematically illustrated. The controller 50 preferably controls the motion and position of the robot arm 26 and is responsible for interpreting the signals or information provided by the sensor 48. The controller 50 can be realized through any conventional computer, microprocessor or other arrangement. Further, although a single controller 50 is schematically illustrated in FIG. 1, a plurality of separate components and/or separate software modules can be used as is understood by those skilled in the art.

Figure 2:
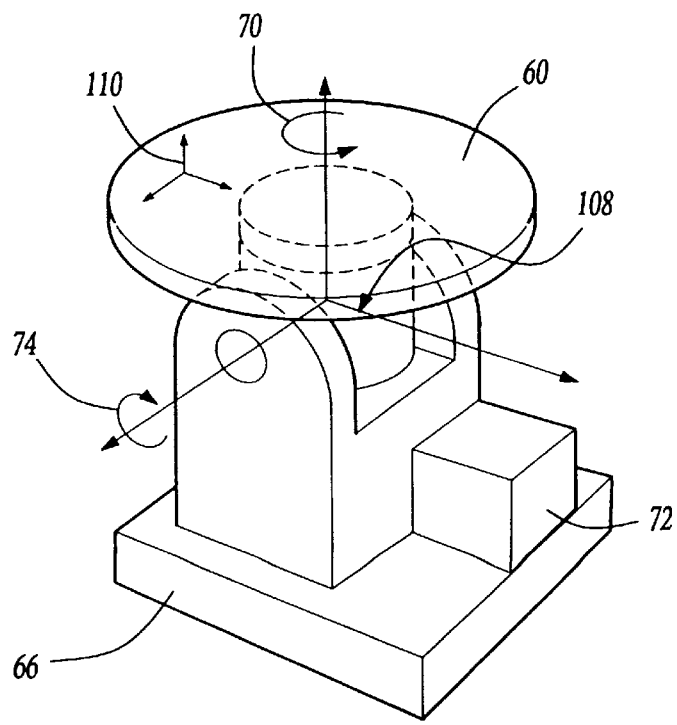
FIG. 2 diagrammatically illustrates the positioner from the arrangement of FIG. 1.
Figure 3A:
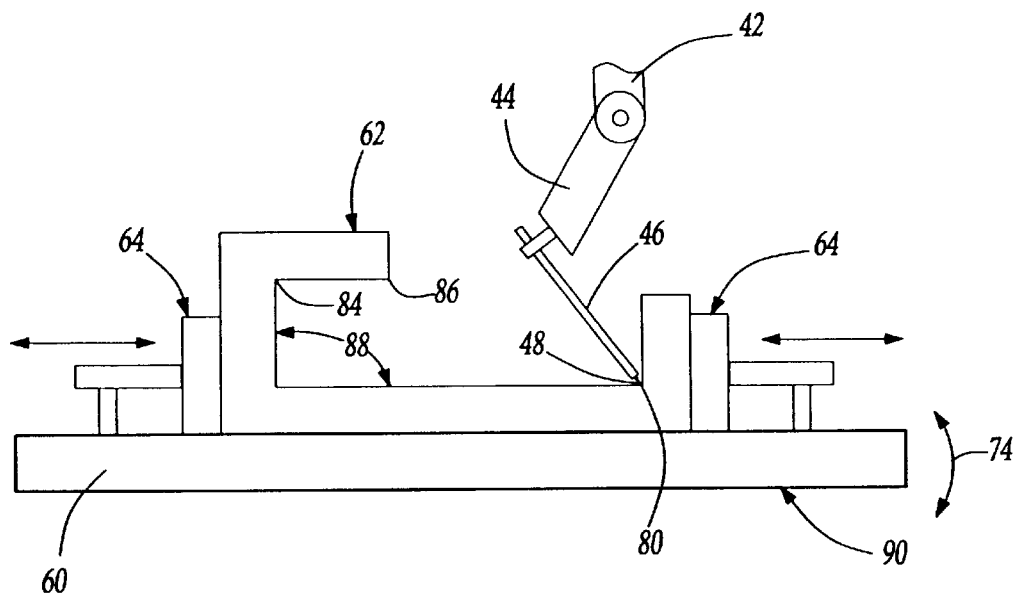
FIG. 3a illustrates the positioner of FIG. 2 and a workpiece in a first position.
Figure 3B:
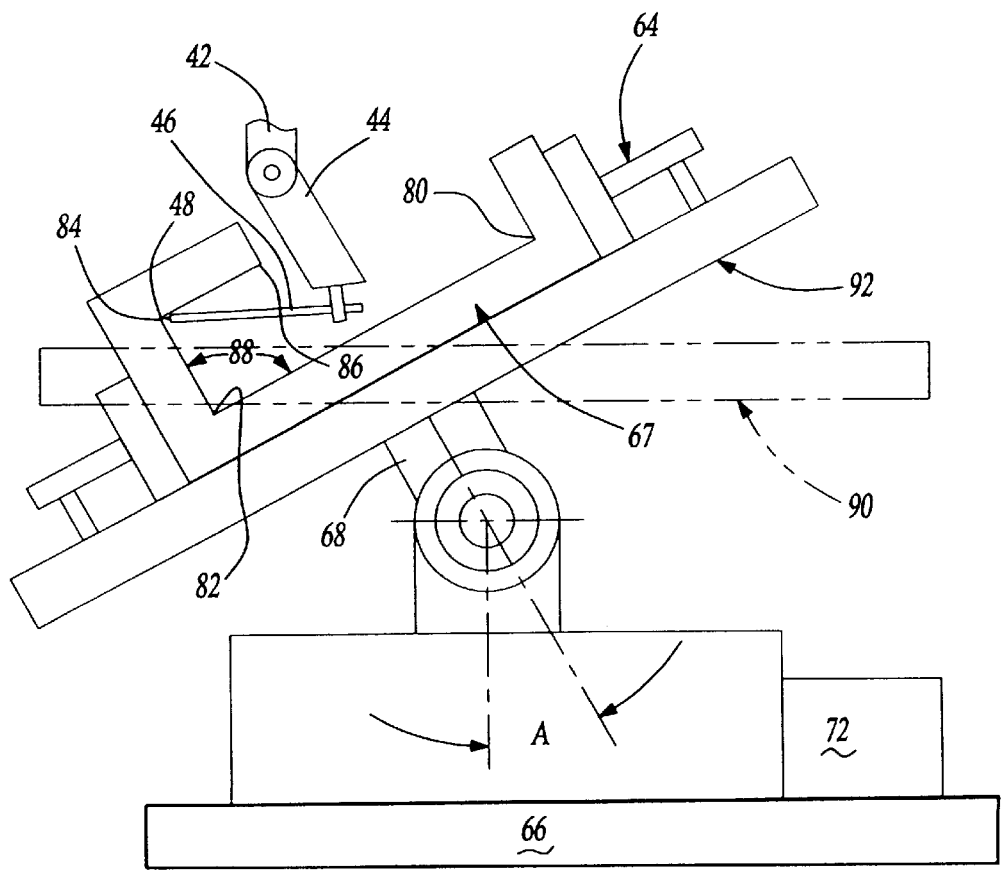
FIG. 3b illustrates the embodiment of FIG. 3A in a second position.

A part positioner 60, which is illustrated best in FIGS. 2, 3a and 3b is shown as a two-axis rotary table this is only one example of the type of positioner that can be used with this invention. A workpiece 62 is supported on the positioner 60 by a set of conventional clamps 64, for example. Importantly, the workpiece 62 must be supported on the positioner 60 so that the workpiece 62 does not move relative to the positioner 60.

A mounting arrangement 66 for the positioner 60 includes a pivoting member 68 and a rotatable coupling between the platform 60 and the member 68 that provide for moving the positioner 60 into a plurality of orientations relative to the robot 22. A controller 72 controls the movement of the positioner 60 according to the arrows 70 and 74, for example. The controller 72 determines the position of the positioner 60 at all times in a conventional manner. The controller 72 communicates with the controller 50 so that the robot controller 50 also knows the position of the positioner 60 at all times. Although separate controllers 50 and 72 are schematically illustrated in FIG. 1, those skilled in the art will appreciate that a single controller can also be implemented for controlling the movement of the robot 22 and/or the movement of the positioner 60.

In many situations, when the workpiece 62 remains stationary relative to the robot 22, the robot 22 cannot adequately contact enough of the workpiece 62 to determine the necessary position and configuration information. This occurs when the workpiece 62 is too large to fit within the robot's work space or has a relatively complex geometric configuration. The moveable positioner 60 provides the ability to move the workpiece relative to the robot during the touch sensing location procedure. Since this invention determines the geometric information of the workpiece relative to a coordinated reference frame, the determined geometric information is useful to accurately compensate a preprogrammed coordinated motion between the robot 22 and the workpiece 62.

Referring now to FIGS. 3a and 3b, the workpiece 62 includes a configuration that prevents the robot 22 from obtaining all the necessary information regarding the workpiece 62 when the positioner 60 is in the orientation 90 as illustrated in FIG. 3a. For example, assume that the points 80, 82, 84 and 86 all must be accurately located relative to the robot 22 in order for the robot to be able to perform a desired welding operation on the workpiece 62. This could be true, for example when a seam is present along the entire inner surface 88 of the workpiece 62 and the robot is to perform a welding operation along the seam (which is not illustrated in the drawings). To ensure that the robot travels along the surface 88 in an accurate manner, the locations of the points 80, 82, 84 and 86 all should be known. Due to the size and physical constraints of the robot 22, the sensor 48 cannot obtain information regarding the points 82, 84, and 86 when the positioner 60 is in the first position 90 illustrated in FIG. 3a. As illustrated, the sensor 48 is able to obtain information regarding the location of a first point 80 while the positioner 60 is in the position 90. To enable the sensor 48 to contact the points 82, 84, and 86, the positioner 60 moves into a second orientation 92 as illustrated in FIG. 3b. Since the workpiece 62 is fixed relative to the positioner 60, it moves with the positioner 60.

This is a significant departure from conventional touch sensing techniques. With conventional procedures, it is impossible to move the workpiece 62 relative to the robot between touches accomplished by a sensor such as the sensor 48. With this invention, however, it is possible to move the workpiece 62 relative to the robot into a variety of orientations so that all position information can be obtained to accurately locate all portions of the workpiece 62 relative to the robot 22. When the workpiece 62 is in the orientation illustrated in FIG. 3b, the robot 22 is controlled to move the sensor 48 into appropriate positions to locate the points 82, 84 and 86 relative to the robot.

It is important to be able to move a workpiece relative to a robot during a touch sensing, locating procedure because many parts have complicated configurations that require moving the workpiece into a variety of orientations so that the robot can obtain the necessary position information. Further, some workpieces or parts are too large, even though their configuration may be relatively simple, for a robot to be able to contact all necessary points to accurately determine the position of the part relative to the robot. By moving the workpiece relative to the robot between touches of the sensor 48, this invention represents a significant improvement over the conventional technique.

The latter situation is illustrated in FIGS. 4a and 4b. In this situation, the workpiece 162 has a welding seam along its length. The workpiece 162 is too big to fit within the robot's work space. $P_1$ represents a starting point on the welding seam and $P_2$ represents the ending or finish point. In FIG. 4a the robot 22 can locate $P_1$ but cannot reach $P_2$ without repositioning the positioner 60 into the orientation shown in FIG. 4b. After locating $P_1$, the positioner 60 is reoriented from the position in FIG. 4a to the position in 4b so the robot 22 can locate $P_2$ and determine the geometric information regarding the seam. It is then necessary to have a coordinated motion between the robot 22 and the workpiece 162 to complete the desired operation (i.e., welding along the seam).

This invention permits touch sensing for accurately locating the workpiece 62 relative to the robot to accommodate manufacturing tolerances that often occur. For example, the workpiece 62 typically has an expected configuration based upon a "master" workpiece or model. During manufacturing processes, there can be deviations from the expected workpiece configuration and these must be determined by the robot system 22 in order to perform an accurate operation on the workpiece.

Another problem that is compensated for by this invention is illustrated in FIG. 5. Even though the workpiece 62 may have a configuration that is exactly identical to an expected configuration, it is possible that an operator does not place the workpiece in an expected position on the positioner 60. FIG. 5 illustrates the workpiece 62 held in a position by the conventional clamps 64. It is possible in some instances for the workpiece to be in the position 62' (illustrated in phantom) because of operator error or the performance of the clamps 64, for example. The robot system 22 must determine the actual position, which includes the location and orientation, of the workpiece 62 on the positioner 60. The techniques of this invention allow for moving the workpiece 62 relative to the robot 22 between touches for accurately determining the position of the workpiece 62 to accommodate for such possible errors and deviations.

The reason why this invention allows for a workpiece to be moved relative to a robot during a locating procedure is that all the position information determined at each touch or each search operation is stored with respect to a coordinated reference frame.

The coordinated reference frame is used throughout the touch sensing location procedure. The robot arm is controlled by the controller 50 to move into a pre-programmed search or approach position for each of the points (i.e., 80–86) that the sensor 48 is to contact. The approach position preferably is defined relative to the robot 22. The robot is also preprogrammed with an approach or search direction that is followed by the robot from the search position until the sensor 48 contacts the workpiece 62. The approach direction is defined within the coordinated reference frame. By defining the approach direction within the coordinated reference frame, the search direction remains the same relative to the workpiece even after the workpiece is reoriented.

The coordinated reference frame preferably is defined relative to positioner 60. The coordinated reference frame remains constant with respect to the positioner 60. Therefore, whenever the positioner moves, the coordinated reference frame also moves. Since the location and orientation of the positioner 60 relative to the robot 22 can be determined and known at all times, it becomes possible to know the relationship between the coordinated reference frame and the robot reference frame at all times.

Referring to FIG. 6, a set of reference frames are schematically illustrated at 100. The world reference frame for the positioner 60 is illustrated at 102. The world reference frame for the robot is illustrated at 104. The relationship between the reference frames 102 and 104 is fixed. The controller 72 preferably constantly monitors the operation of the positioner support system 66 so that it is always aware of the orientation of the positioner 60. The reference frame 106 is the user frame of the positioner and the reference frame 108 is shown in FIG. 2. Since this information is known by the controller 72, a relationship between the positioner world frame 102 and the coordinated reference frame 110 can always be determined. Known kinematic relationships provide the information needed to convert from the coordinated reference frame 110 to the positioner world frame 102. The known kinematic relationships are schematically illustrated in FIG. 6 as the reference frames 106 and 108. The specifics of the kinematic relationships will depend upon the particular embodiment and given this description, those skilled in the art will be able to determine how to obtain the necessary relationship information.

The relationship between the world reference frames 102 and 104 and the known kinematic relationships between the working robot reference frames 112, 114 and 116 relative to the world reference frame 104 provide the necessary information to convert from the robot UFRAME 116 to the coordinated reference frame 110. Again, since kinematic relationships vary depending on the particular components of a particular embodiment, those skilled in the art will be able to determine the necessary relationships given the parameters of their particular arrangement.

In the preferred embodiment, the search frame is defined in terms of the coordinated reference frame 110. The search frame preferably is defined by a series of taught positions or by using a conventional direct input method. The preferred embodiment includes defining an orthogonal search frame relative to the UFRAME 116 of the robot using the taught positions with respect to the robot world frame 104. Transformations are then used, based upon the relative locations between the coordinated frame and the UFRAME of the robot, to convert the search frame relative to the coordinated frame. During the entire search operation, the search frame remains unchanged relative to the coordinated frame 110. During the search motion (i.e., the touching of the sensor 48 to the target points on the workpiece 62), the search direction relative to the coordinated reference frame 110 is converted into a search direction relative to the UFRAME 116 of the robot so that the robot controller 50 causes the robot to move within the coordinated reference frame 110.

Determining the geometric information of the workpiece 62 preferably begins using a mastered search operation. A sample or "teaching" workpiece is placed in a desired position on the positioner 60. All of the necessary target points are then located using the sensor 48 and those positions are stored in memory as the master position information relative to the coordinated frame 110. The master position information determines the programmed positions for the robot 22. Any differences between actual location information and the master information represents the offset of the workpiece away from its mastered position. As discussed above, an offset can be the result of an inaccurate placement of the workpiece 62 on a positioner 60 or manufacturing imperfections, for example. During subsequent actual search operations, the determined positional information of the workpiece is compared to the pre-recorded and stored master information. The master position and the offset information determined during the touch sensing procedure preferably are stored in memory relative to the coordinated frame 110.

The controller 50 preferably operates by recording each searched result (i.e., each time the sensor 48 contacts a target point) initially with respect to the UFRAME 116 of the robot. Each of the recorded positions preferably are then converted to values corresponding to the coordinated frame 110 using the known kinematic relationships between the coordinated frame 110 and the UFRAME 116 of the robot. This is repeated for each of the target points (i.e., 80, 82, 84 and 86). Since all of the positional information is ultimately determined with respect to the coordinated frame 110, the offset between an actual workpiece position and the expected workpiece position is also preferably recorded as a value with respect to the coordinated reference frame 110.

After recording all of the position information, which includes location, orientation and configuration information of the workpiece 62, the robot operating parameters preferably are then adjusted so that the robot 22 performs the desired operation with accuracy. During the coordinated motion control operation, the results of the touch sensing location operation are applied to the robot parameters defining the desired path of the robot during the operation. The robot destination position, which includes the expected position modified by the determined offset, preferably is always defined with respect to the UFRAME 116 of the robot. The offset value that was determined relative to the coordinated frame 110, therefore, must be converted to the UFRAME 116 during the coordinated motion between the robot 22 and the workpiece 62.

Given this description and the specifics of a particular embodiment, those skilled in the art will be able to determine the necessary conversion between the determined offset in a coordinated reference frame 110 and the UFRAME 116.

By performing the touch sensing positioning procedure within the coordinated reference frame 110, this invention represents a significant improvement over the conventional techniques because the workpiece 62 can be re-oriented relative to the robot throughout the touch sensing procedure. Given this description, those skilled in the art will be able to develop and implement the necessary software to perform the operations described in this specification.

The above description is exemplary rather than limiting in nature. Variations and modifications may become apparent to those skilled in the art that do not depart from the purview and spirit of this invention. The legal scope of protection for this invention is limited only by the following claims.

What is claimed is:

1. A method of determining a position of a workpiece relative to a robot having an arm supported by a base and a sensor supported on the robot arm where the workpiece is supported on a positioner that is movable relative to the robot with the positioner having a workpiece reference frame indicative of a location of the workpiece in a workspace of the robot, said method comprising the steps of:

(A) mounting the workpiece on the positioner such that the workpiece and the workpiece reference frame remains fixed relative to the positioner;

(B) orienting the positioner and the workpiece reference frame in a first orientation;

(C) determining the relative location of the robot to the first orientation of the positioner;

(D) moving the robot arm until the sensor contacts the workpiece near at least a first target point on the workpiece to determine an offset between an expected location of the first target point and an actual location of the first target point relative to the robot and then moving the sensor away from the workpiece;

(E) moving the positioner and the workpiece reference frame into a second orientation;

(F) determining the relative location of the robot to the second orientation of the positioner such that relative locations of both the expected and actual locations of the target points to the robot is maintained;

(G) moving the robot arm until the sensor contacts the workpiece near at least a second target point on the workpiece to determine an offset between an expected location of the second target point and an actual location of the second target point relative to the robot; and (H) determining the shape and position of the workpiece relative to the robot using the actual locations of the first and second target points and determining the relative location of the robot to the workpiece reference frame.

2. The method of claim 1, further comprising the steps of predetermining an expected workpiece position relative to the robot; and determining a workpiece position offset value by comparing the determined position of step (H) to the expected workpiece position.

3. The method of claim 1, further comprising the steps of preprogramming a set of robot operation parameters that define a robot operation to be performed on the workpiece;

applying the offset value to the robot operation parameters to automatically adjust the preprogrammed robot operation parameters to conform to the determined workpiece position of step (H); and performing the operation on the workpiece using the adjusted preprogrammed operation parameters after performing steps (A) through (H).

4. The method of claim 1, wherein step (H) includes determining a location and orientation of the workpiece relative to the robot to determine a geometric configuration of the workpiece while the workpiece is moved between different positions by the positioner.

5. The method of claim 1, wherein step (D) is performed by determining the location of the first target point on the workpiece relative to the robot.

6. The method of claim 5, wherein step (G) is performed by determining the location of the second target point on the workpiece relative to the robot.

7. The method of claim 1, wherein steps (D) and (G) are respectively performed by defining a search position for the robot relative to the robot;

defining a search direction for the robot to move from the search position relative to the workpiece reference frame.

8. The method of claim 1, further comprising determining the position of the workpiece relative to the robot and then determining an offset value indicative of a difference between the determined position and an expected workpiece position relative to the robot.

9. The method of claim 1, wherein step (D) includes contacting and locating a plurality of target points.

10. The method of claim 1, wherein step (G) includes contacting and locating a plurality of target points.

11. The method of claim 1, further comprising moving the positioner and the workpiece reference frame into a further plurality of orientations, contacting at least one target point in each orientation to locate the target points relative to the robot and then performing step (H).

12. The method of claim 11, further comprising determining the relative location of the robot to the positioner and the workpiece reference frame after each movement of the positioner into the further plurality of orientations such that the relative locations of each contacted target point to the robot is maintained.

13. A system for determining a position of a workpiece, comprising:

a robot base;

a robot arm supported by said base and being movable into a plurality of positions relative to said robot base;

a sensor supported on the robot arm;

a positioner located in a predetermined position relative to said robot base and movable into a plurality of orientations relative to said robot base with said positioner having a workpiece reference frame, said positioner including a device for fixedly supporting the workpiece on said positioner;

a controller that controls movement of said robot arm and said positioner such that said sensor contacts the workpiece near at least a first target point on the workpiece when said positioner is in a first orientation relative to said robot base and determines an offset value between an expected location of the first target point relative to said robot base and an actual location of the first target point relative to said robot base and said controller moving said positioner and said workpiece reference frame to a second orientation and determining the relative location of said robot base to the second orientation of said positioner such that the relative location of the first target point to said robot base is maintained, wherein said sensor contacts the workpiece near at least a second target point on the workpiece when said positioner is in the second orientation relative to said robot base and said controller determines an offset value between an expected location of the second target point relative to said robot base and an actual location of the second target point relative to said robot base and wherein said controller determines the position of the workpiece relative to said robot base, using the determined actual locations of the first and second target points.

14. The system of claim 13, wherein said controller includes a memory and wherein said memory includes a stored workpiece reference frame and a recorded expected position of the workpiece relative to said robot base and wherein said controller determines an offset value indicative of a difference between the determined location of the workpiece and said expected position relative to said robot base.

15. The system of claim 13, wherein said controller includes a memory having a plurality of approach positions stored relative to said robot base and an associated plurality of approach directions stored relative to said workpiece reference frame, said controller causing said robot arm to move into said approach positions and then to follow said approach direction such that said sensor contacts the workpiece near the target points.

16. The system of claim 13, wherein said workpiece reference frame moves with said positioner.

17. The system of claim 13, wherein said controller causes said positioner and said workpiece reference frame to move into said second orientation after said sensor has contacted the workpiece near said first target point and near at least one other target point while said positioner and said workpiece reference frame is in said first orientation and said controller causes said robot arm to move such that said sensor contacts said second target point after said positioner is moved into said second orientation.

18. The system of claim 13, wherein the controller determines a location and orientation of the workpiece relative to the robot base to determine a geometric configuration of at least a portion of the workpiece while the workpiece is moved between different positions by the positioner.

19. A method of determining a position of a workpiece relative to a robot having an arm supported by a base and a sensor supported on the arm, the workpiece being supported on a positioner that is movable relative to the robot with the positioner having a workpiece reference frame indicative of a location of the workpiece in a workspace of the robot, said method comprising the steps of:
mounting the workpiece on the positioner such that the workpiece remains fixed relative to the positioner and the workpiece reference frame;
orienting the positioner and the workpiece reference frame in a first orientation;
determining the relative location of the robot to the first orientation of the positioner;
moving the arm of the robot until the sensor determines a first target point on the workpiece to locate the first target point relative to the robot;
moving the positioner and the workpiece reference frame into a second orientation;
determining the relative location of the robot to the second orientation of the positioner such that the relative location of the first target point to the robot is maintained;
moving the arm of the robot until the sensor determines a second target point on the workpiece to locate a second target point relative to the robot; and
determining the locations of the first and second target points relative to the robot to determine a shape of the workpiece while the workpiece is moved between different positions by the positioner and determining the relative location of the robot to the workpiece reference frame.

20. The method as set forth in claim 19 wherein moving the arm of the robot is performed by;
defining a search position for the robot relative to the robot;
defining a search direction for the robot to move from the search position relative to the workpiece reference frame.

21. The method as set forth in claim 19 wherein moving the arm of the robot further includes contacting and locating a plurality of target points.

22. The method as set forth in claim 19 further including the step of moving the positioner and the workpiece reference frame into a further plurality of orientations, contacting at least one target point in each orientation to locate the target points relative to the robot.

23. The method as set forth in claim 22 further including the step of determining the relative location of the robot to the positioner and the workpiece reference frame after each movement of the positioner into the further plurality of orientations such that the relative locations of each contacted target point to the robot is maintained.

24. A system for determining a position of a workpiece, comprising:
a robot base;
a robot arm supported by said robot base and being movable into a plurality of positions relative to said robot base;
a sensor supported on the robot arm;
a positioner located in a predetermined position relative to said robot base and movable into a plurality of orientations relative to said robot base with said positioner having a workpiece reference frame,
a device mounted to said positioner for fixedly supporting the workpiece on said positioner;
a controller that controls movement of said robot arm and said positioner such that said sensor determines a first target point on the workpiece when said positioner is in a first orientation relative to said robot base, said controller moving said positioner and said workpiece reference frame to a second orientation and determining the relative location of the robot base to the second orientation of said positioner such that the relative location of the first target point to the robot base is maintained, said controller moving said robot arm such that said sensor determines a second target point on the workpiece when said positioner is in said second orientation relative to said robot base wherein said controller determines the position and the shape of the workpiece relative to said robot base using the first and second target points.

25. The system as set forth in claim 24 wherein said controller includes a memory and wherein said memory includes stored robot and workpiece reference frames.

26. The system as set forth in claim 24 wherein said controller includes a memory having a plurality of approach positions stored relative to said robot base and an associated plurality of approach directions stored relative to said workpiece reference frame, said controller causing said robot arm to move into said approach positions and then to follow said approach direction such that said sensor contacts the workpiece near the target points.

27. The system as set forth in claim 24, wherein said workpiece reference frame moves with said positioner.

28. The system as set forth in claim 24 wherein said controller causes said positioner and said workpiece reference frame to move into said second orientation after said sensor has contacted the workpiece at said first target point and at least one other target point while said positioner and said workpiece reference frame is in said first orientation and said controller causes said robot arm to move such that said sensor contacts said second target point after said positioner is moved into said second orientation.

* * * * *